United States Patent [19]

Crawford et al.

[11] 4,008,350

[45] Feb. 15, 1977

[54] VISCO-ELASTIC MATERIAL COMPRISING A POLYMERIC FOAM IMPREGNATED WITH AN ACRYLIC RESIN

[75] Inventors: George H. Crawford, Dellwood; Howell K. Smith, II, Grant Township, Washington County, both of Minn.

[73] Assignee: Minnesota Mining and Manufacturing Company, St. Paul, Minn.

[22] Filed: Aug. 31, 1972

[21] Appl. No.: 285,320

[52] U.S. Cl. .................................. 428/311; 2/239; 260/2.5 BE; 427/385 B; 428/315

[51] Int. Cl.² ........................ B32B 3/26; B32B 5/18

[58] Field of Search ............... 117/138.8 D, 98; 260/2.5 BE; 427/385 B; 428/311, 315; 2/239

[56] References Cited

UNITED STATES PATENTS

| | | | |
|---|---|---|---|
| 3,070,476 | 12/1962 | Miller | 428/160 |
| 3,503,822 | 3/1970 | Turkewitsch | 156/292 |
| 3,635,848 | 1/1972 | Rambosck | 260/37 |
| 3,665,918 | 5/1972 | Lindquist et al. | 428/160 |

Primary Examiner—Ronald H. Smith
Assistant Examiner—Sadie L. Childs
Attorney, Agent, or Firm—Alexander, Sell, Steldt & DeLaHunt

[57] ABSTRACT

A padded stocking, suitable as footwear in conjunction with a ski boot or the like, is provided comprising a stocking having affixed to the ankle and shin region thereof a conformable layer of a visco-elastic material, such as a flexible open-cell polyurethane foam impregnated with an acrylic resin, which functions as a padding, said conformable layer having retarded deformation and recovery characteristics such that said layer with a thickness of at least 1/8 inch has a compression modulus of 1 to 15 pounds per square inch when measured at a deformation rate of 2 inches per minute and a plot of said compression modulus versus time yields a curve with a slope of −0.3 to −2.0 pounds per square inch per second when said layer is compressed at deformation rates of 2 to 20 inches per minute.

2 Claims, 3 Drawing Figures

VISCO-ELASTIC MATERIAL COMPRISING A POLYMERIC FOAM IMPREGNATED WITH AN ACRYLIC RESIN

In one aspect, this invention relates to padded stockings adapted for use with high-topped shoes, boots or skates in order to make the shoe or skate fit the wearer's ankle. In a further aspect, this invention relates to impregnated foams having modified rheological properties.

The most critical regions of athletic footwear, e.g. ski boot or skate, related to comfort and control are the upper heel, lower shin and ankle proper. Presently available mass-produced plastic or leather boots, shoes, skates, or like footwear used in various athletic activities are produced to standard sizes without regard to individual differences in foot size and shape especially in the aforementioned critical region. A mismatch between the individual's foot configuration and the configuration of mass-produced footwear results in movement of the foot relative to the boot or shoe while the individual is engaged in a sport such as skiing or skating. Said movement of the individual's foot results in discomfort due to the friction between the boot and foot as well as resulting in localized pressure points where contacting points on the individual's ankle or shin take all of the pressure of the boot rather than distributing the pressure over the entire lower leg and foot. In particular, if a skier does not have little or no movement of the foot relative to the boot, his control over the angle between the edge of the ski and the surface of the snow (which is important in turning, maneuvering and avoidance of sideslip, particularly under icy conditions) will be impaired. In addition, it is important that the boot be fitted so the heel of a skier not lift inside the boot during up-and-down motions.

Various methods have been proposed or used to overcome these problems. For example, foam or sponge rubber pads have been inserted in the boot linings to form a pad (e.g. see U.S. Pat. No. 2,526,831). Also, various waxes, powders, and mixtures encased in bags have been developed which creep and flow under pressure or heat and which have been used as filler to achieve a fit between a boot and an individual (e.g. see U.S. Pat. Nos. 3,325,920 and 3,237,319). More recently, custom fitted boots have become available which are individually fitted by placing a liquid foaming resin in the cavities formed between the boot and a set of mandrels corresponding to an individual's foot while the mandrels are in the boot (e.g. see U.S. Pat. No. 3,377,321). Another solution (U.S. Pat. No. 3,003,154) has been a sock having a plurality of pads placed in the shin and ankle region.

The prior art while providing pads which decrease abrasion and help fit the boot to the wearer's foot has certain disadvantages connected with their use. Sponge or foam rubber pads are highly elastic, that is, they respond quickly to impressed stresses by compressing and recover almost instantly when the stress is removed. If the pads are made of sponge or foam rubber having a low compression modulus, the pads allow movement of the foot relative to the boot and do not provide firm support for the foot, decreasing the skier's control over his skis. Conversely, if the compression modulus of the pad is raised to compensate for the lack of support, the pad material is constantly exerting pressure against the ankle in proportion to the imposed deformation and the wearer will suffer from pressure points due to the high elastic recovery force of the pad material.

Boots which are custom-fitted with a foam provide an excellent fit when first fitted; however, the boots do not have the ability to change and provide support as the individual's foot swells or shrinks over a period of time.

Inelastic, flowable materials, such as waxes, powder formulations and the like, creep, sag, and have little or no powers of recovery from deformation. These materials generally fail to provide the adaptation, re-adaptation and support desired in boot padding wherein support and recovery are important characteristics. Further, such compositions tend to be of high density and add weight to the user's feet thereby resulting in balance problems and additional muscle strain.

Briefly, the padded stocking or boot fitter of this invention, suitable for skiers and the like, comprises a conformable layer of a visco-elastic material affixed to a stocking in the form of a layer of padding having a thickness of at least ⅛ inch. The foam has defined rheological characteristics, the compression modulus being about 1 to 15 pounds per square inch when measured at a compression rate of 2 inches per minute and the slope of the compression modulus versus time for compression to 50 percent of the original thickness of a 1 inch cube curve will be approximately −0.3 to −2.0 pounds per square inch per second when the material is compressed within the compression rate range of about 2 to 20 inches per minute. The padded stocking of this invention combines conformability, (that is, the stocking fills the gaps and discontinuities between a standard boot and an individual's shin, ankle, etc.), and retarded viscous flow so that compression modulus varies with compression rate.

Figure 2:
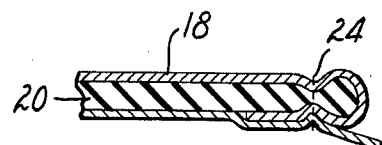
FIG. 2 is a cross-sectional view of the padded stocking taken along the plane 2—2.
Figure 1:
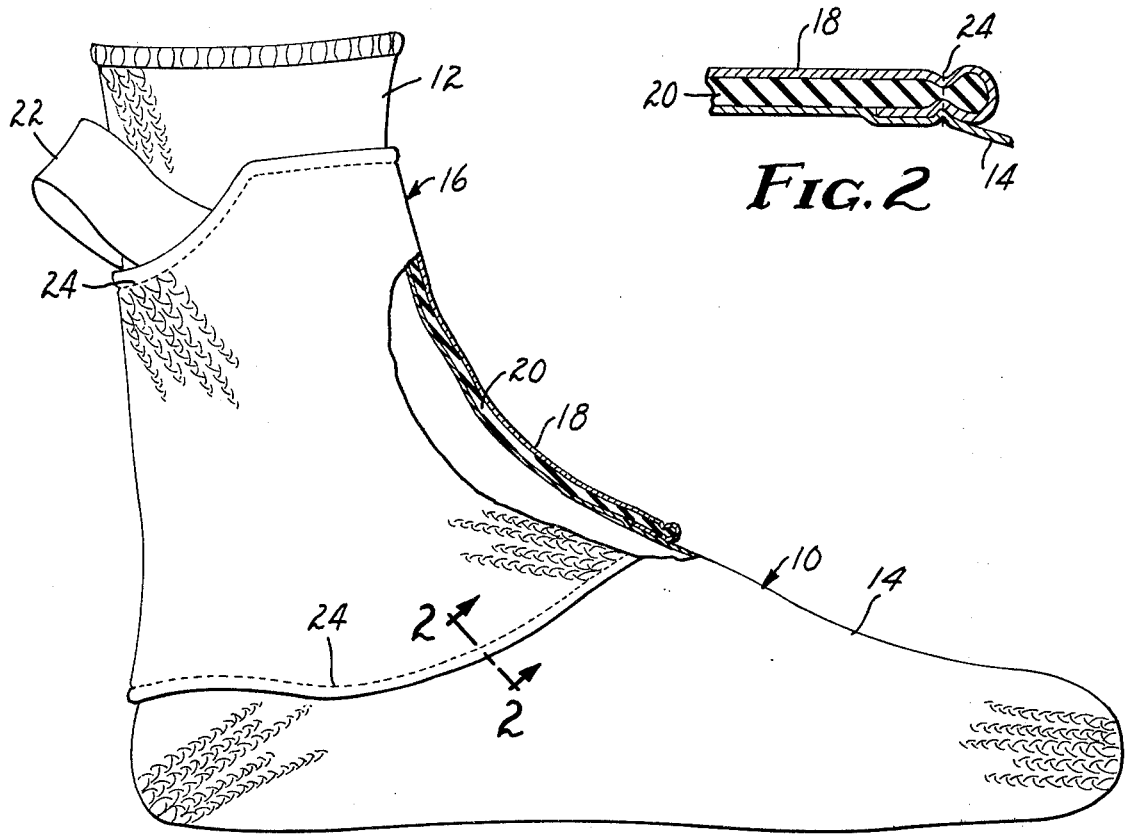
FIG. 1 is a side elevation in partial section of an embodiment of the padded stocking of this invention.

Referring to the accompanying drawing, a stocking or sock 10 having a leg portion 12 and a foot portion 14 has disposed thereon and attached thereto in the ankle and shin region a padding generally designated 16 which comprises a sheath 18 of soft, flexible material which together with the adjacent portion of sock 10 covers and holds in place a visco-elastic layer 20 having desirable rheological properties. The sheath 18 holds the visco-elastic layer 20 in place during the stresses and strains produced when the sock 10 is worn for athletic endeavors. The padded sock 10 as shown has a pull-on strap 22, sewn to the sock, useful for assisting the wearer in pulling the sock on; however, this is not necessary for the practice of this invention and the padded sock 10 can be pulled on merely by gripping at the top. The sheath 18 is attached to sock 10 by means of stitching 24 at the top and the bottom of the sheath, the stitching encircling the entire sock. Although the padded sock as depicted in FIG. 1 has a sheath 18 which extends the life of the layer 20, the latter can be attached to the sock by stitching or an adhesive without the sheath. The sock 10, sheath 18, and strap 22 can be of knit or woven fabric, e.g. cotton, wool, nylon, etc. and blends thereof commonly used in making stockings.

Figure 3:
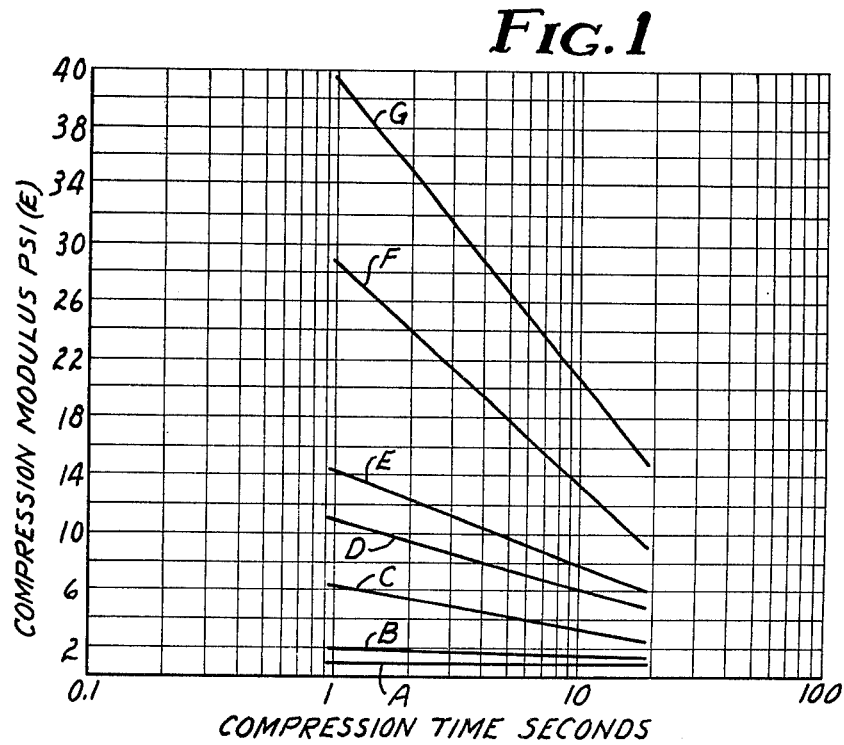
FIG. 3 is a semi-logarithmic plot of compressive modulus versus time for various visco-elastic paddings useful in this invention.

FIG. 3 shows the compression modulus versus time curves for a variety of visco-elastic materials useful as padding in this invention. The visco-elastic materials are an open-celled polyurethane foam impregnated with acrylic latices, the foam and latices being hereinafter described, see especially Example 1. The amount of impregnating material and foam characteristics are tabulated in TABLE I.

TABLE I

| Curve | Grams of Latex Solids Per Cubic Inch of Foam | Slope of the Compression Modulus V. Time Curve |
|---|---|---|
| A | none | −0.004 |
| B | 1.5 | −0.08 |
| C | 3.0 | −0.36 |
| D | 4.5 | −0.55 |
| E | 6.0 | −0.73 |
| F | 7.5 | −1.7 |
| G | 9.0 | −2.3 |

The specimens were tested in the form of 1 inch cubes on an "Instron" (Model TT-BM) using ASTM Standard D-575-46 modified by using compression rates in the range of 2 inches per minute to 20 inches per minute. The 1 inch cubes of impregnated foam were compressed to 50 percent of the original thickness to determine the compression modulus. In FIG. 3, a time of 1 second corresponds to a compression rate of 20 inches per minute and a time of 10 seconds corresponds to a compression rate of 2 inches per minute. Curve A is a polymeric foam without any impregnating latex and curve B is an impregnated foam having a small amount of latex. Both of these curves have slopes which fall below −0.3 and are outside the acceptable limits for a visco-elastic material useful as padding in this invention since their compression moduli is too low at high compression rates. The foams represented by curves A and B would be subject to rapid deformation at high compression rates, allowing movement of the foot relative to the footwear and resulting in a loss of control and support. Curve G is a highly impregnated polymeric foam which has a compression modulus of about 20 pounds per square inch when compressed at 2 inches per minute, too high to form a comfortable stocking. In addition, visco-elastic materials of this character would be so unresponsive at high compression rates that extreme discomfort would result. Curves C, D, E and F represent impregnated foams having the rheological properties desirable for a comfortable padded stocking. These materials have retarded visco-elastic properties resulting in slopes of −2.0 to −0.3, so that padded stockings made with these foams will offer good support and control. In addition, they have a compression moduli of about 3 − 13 pounds per square inch at compression rates of 2 inches per second and padded stockings made with these materials will conform to the gaps and discontinuities between an individual's foot and his footwear, thereby insuring a more comfortable fit.

Visco-elastic materials having a slope of compression modulus versus time of about −0.45 to −1.0, represented by curves D and E, are suitable for making padded stockings for the average recreational skier of average height and build. Stockings made from these materials provide firm support and good control.

Competition skiers would require a greater stiffness and resistance to rapid deformation, that is, a material having a compression modulus versus time curve slope of 1.5 to about 2.0, due to the increased speed and stresses encountered in competitive skiing. Thus, a visco-elastic material having a higher compression modulus tailored to the more stringent requirements can be formed. Curve F is an example of visco-elastic material having a higher compression modulus of about 12.30 at 2 inches per minute deformation rate and a compression modulus of 27.60 pounds per square inch at 20 inches per minute. The slope defined by this curve is −1.7 pounds per square inch per second and requires greater stresses for deformation. Visco-elastic materials having the steeper slopes provide better support and control under the rigorous conditions encountered in competition. Generally it is desirable, even in competition, to use visco-elastic materials having a slope of about −2.0 or less in order to avoid undue rigidity of the foam and consequent discomfort.

Conversely, women and children, due to size and weight, require a softer and more resilient visco-elastic material for comfort. The rheological properties of such a material are shown by curve C. This material has a compressive modulus of 2.88 pounds per square inch at a compression rate of 2 inches per minute and a modulus of 6.08 pounds per square inch at a compression rate of 20 inches per minute. The slope of this material is −0.36 pounds per square inch per second requiring less stress for deformation and giving a faster recovery for greater comfort.

The properties defined by the laboratory test specimens have been found to correlate well with the results obtained in actual use tests.

The visco-elastic padding materials of this invention have retarded visco-elastic properties which allow them to compress slowly under stress and recover slowly after the stress has been removed. This retarded action means the materials provide excellent support characteristics to the critical region of ankle, shin, and upper heel of the athlete at the same time providing sufficient compression properties to fill the gaps between the wearer's ankle and the boot or footwear and provide the wearer with protection from abrasion. These visco-elastic materials also have a higher compression modulus at higher deformation rates so that sharp forces do not result in large deformations. These visco-elastic materials are particularly useful as paddings for stockings used for athletic use.

One example of a visco-elastic material suitable for forming the conformable layer of the padded stocking of this invention is a synthetic foam, such as a polyurethane foam, impregnated with a thermoplastic or thermosetting resin, such as an acrylic latex. The resin coats the cell walls of the foam and through viscous flow retards the foam's response to the compressive stress. On release of compressive stress, the resin slows the natural tendency of the foam to recover to its original dimensions. In such resin-modified foams, the compressive modulus and recovery rate are dependent upon the density of the foam, and cross link density of the foam. The flow characteristics of the thermosetting or thermoplastic additive resin and the ratio of the resin to foam also contribute to determine the rheological characteristics of the composite resin-modified foams. Denser elastomeric foams, e.g. to 4 pounds per cubic foot, have a higher restorative force, forming stiffer visco-elastic materials. Impregnating resins with higher glass transition temperatures, e.g. 20° to 30° C., have a greater resistance to deformation and provide greater retardation of recovery of elastomeric materials impregnated or modified with these resins.

Foams suitable for use in this invention will have densities of about 1 to 4 pounds per cubic foot before modification or impregnation with a resin. Various types of flexible, open-cell foams can be modified, such as polyurethanes, natural rubber, etc.; additional foams useful in the practice of this invention can be found in Encyclopedia of Polymer Science and Technology, Volume 3, "Cellular Materials", Interscience Publishers, New York (1965).

The resins chosen for impregnating a polymeric foam will be in a dispersing medium which does not attack or degrade the foam. It is preferred that the resin be in aqueous dispersion form because water will not attack or degrade most polymeric foams.

The foam is impregnated by treating the foam with a dispersion of the chosen resin and allowing the foam to imbibe the dispersion. When the desired amount of resin has been imbibed the impregnated foam is removed and heated gently to drive off the dispersant present. The resulting material is an impregnated foam having retarded visco-elastic properties.

Objects and advantages of this invention are further illustrated in the following example, but it should be understood that the particular materials used in this example, as well as amounts thereof, and the other details described, should not be construed to limit this invention. All parts are by weight unless otherwise noted.

A 12-inch square by 0.25-inch thick sheet of elastomeric open-celled polyurethane foam having a bulk density of 1.6 pounds per cubic foot (available from Tenneco Chemicals Inc. as P-3800) was allowed to absorb a blend of acrylic latices. The latex blend comprised 173 grams of "Rhoplex AC-34", an acrylic aqueous emulsion polymer having 46.5 percent solids, and 134 grams "Rhoplex E-358", a self-crosslinking acrylic aqueous emulsion having 60 percent solids. The foam absorbed all the latex. The latex-filled foam was oven dried for 1 hour at 250° F. The compressive response characteristics were measured using an Instron (Model TT-BM) according to ASTM standard D-575-46. The measured room temperature compression modulus for 50 percent compression at 2 inches per minute was 5.75 pounds per square inch and at 20 inches per minute the compression modulus was 10.70 pounds per square inch. These data were plotted on a semi-logarithmic chart with time to 50 percent compression of a 1 inch thick specimen as the abscissa and compression modulus as the ordinate and resulted in a curve with a slope of −0.55. The impregnated foam was cut to a generally rectangular shape about 7 inches wide by 11 inches long with two semi-circular sections cut out at the center of the long edges. The short edges of the shaped foam were adhesively bonded with contact cement to form a tubular shaped article. A cotton knit material, which comes in tubular form, was cut longer than the shaped tubular article to be covered and pulled over the shaped foam tube. The excess fabric was pushed to the inside of the foam tube enclosing the ends of the tube in the fabric. The foam tube in its knit sheath was positioned over a 50 percent nylon- 50 percent wool ski sock with the cutouts in the region of the heel and lower calf. The edges of the sheath and foam were stitched to the stocking. The stocking was provided with a pull-on strap, the finished stocking being similar to that shown in FIG. 1.

A suitable padded stocking can be formed without the fabric sheath covering the foam. It is generally preferred, however, to use the fabric sheath to provide a protective layer for the polymeric foam and increase the life of the boot fitter.

Upon testing under actual skiing conditions, the boot fitter was found to provide excellent fit and support throughout the critical region of heel, shin and ankle, providing good conformability and comfort to the wearer without causing undue pressure points on the ankle, shin and heel of the wearer. The padded sock also provided good control of the ski edges during the test due to the retarded visco-elastic property of the foam support.

As mentioned, non-filled foams can also be used as the visco-elastic material for the padded stocking of this invention. For example, U.S. Pat. No. 3,635,848 describes isocyanurate-modified urethanes, urethane-modified isocyanurate or mixed poly(urethane-isocyanurate) materials prepared using organic borate esters as catalysts to trimerize isocyanate terminated prepolymers or polyisocyanates in the presence of polyols. These isocyanate-derived polymers can be prepared as foams using silicone oils, organo-silicones, or fluoroalkyl amines as foam stabilizers, see especially Examples 14, 15 and 25 of said U.S. Pat. No. 3,635,848.

Various modifications and alterations of this invention will become apparent to those skilled in the art without departing from the scope and spirit of this invention, and it should be understood that this invention is not to be limited to the illustrative embodiment set forth herein.

What is claimed is:

1. A visco-elastic material having retarded recovery characteristics comprising a polymeric foam impregnated with an acrylic resin, said foam having a compression modulus at a compression rate of 2 inches per minute, of about 1-to-15 pounds per square inch and having a compression modulus versus time curve slope of about −0.3 to −2.0 pounds per square inch per second when compressed to 50 percent of the original thickness at rates ranging from 2-to-20 inches per minute.

2. A visco-elastic material having retarded recovery characteristics comprising an open-celled polyurethane foam having a density from about 1 to 4 pounds per cubic foot impregnated with an acrylic latex resin, said foam having a compression modulus, at a compression rate of 2 inches per minute, of about 1 to 15 pounds per square inch, said foam having a compression modulus versus time curve slope of about −0.3 to −2.0 pounds per square inch per second, when compressed to 50 percent of the original thickness at rates ranging from 2 to 20 inches per second.

* * * * *